United States Patent [19]

Kokura

[11] Patent Number: 5,249,017
[45] Date of Patent: Sep. 28, 1993

[54] IMAGE FORMING APPARATUS

[75] Inventor: Yasuhide Kokura, Osaka, Japan

[73] Assignee: Minolta Camera Kabushiki Kaisha, Osaka, Japan

[21] Appl. No.: 803,736

[22] Filed: Dec. 9, 1991

Related U.S. Application Data

[63] Continuation of Ser. No. 487,251, Mar. 2, 1990, abandoned.

[30] Foreign Application Priority Data

Mar. 2, 1989 [JP] Japan .................................. 1-51353
Mar. 2, 1989 [JP] Japan .................................. 1-51354

[51] Int. Cl.⁵ ............................................. G03B 27/74
[52] U.S. Cl. .................................................. 355/68
[58] Field of Search ................ 355/27, 28, 38, 40, 355/41, 44, 45, 68, 203, 204, 205, 209, 271

[56] References Cited

U.S. PATENT DOCUMENTS

| | | | |
|---|---|---|---|
| 4,341,463 | 7/1982 | Kashiwagi et al. | 355/203 X |
| 4,829,371 | 5/1989 | Hiramatsu et al. | 355/38 X |
| 4,835,577 | 5/1989 | Fujita et al. | 355/68 |

Primary Examiner—Michael L. Gellner
Assistant Examiner—Khanh Dang
Attorney, Agent, or Firm—Burns, Doane, Swecker & Mathis

[57] ABSTRACT

A printer automatically discriminates whether a charged microfilm is a negative film or a positive film and reproduces a positive image on a recording sheet from an image recorded on the microfilm. The discrimination between a negative film and a positive film is automatically attained by the detection of the luminous energy of a light traveling through the microfilm and the N-P mode or the P-P mode, whichever conforms to the outcome of the detection, is set. The kind of film found by the discrimination is displayed on a display part. Then the key operation is made after the copying performed under the automatically set mode is completed, the existent mode is switched to the opposite mode. By the key input, the operator is allowed to set either of the modes mentioned above. Even when the judgment on the kind of film yields an erroneous result, the number of incorrect copies can be minimized by a simple procedure.

8 Claims, 11 Drawing Sheets

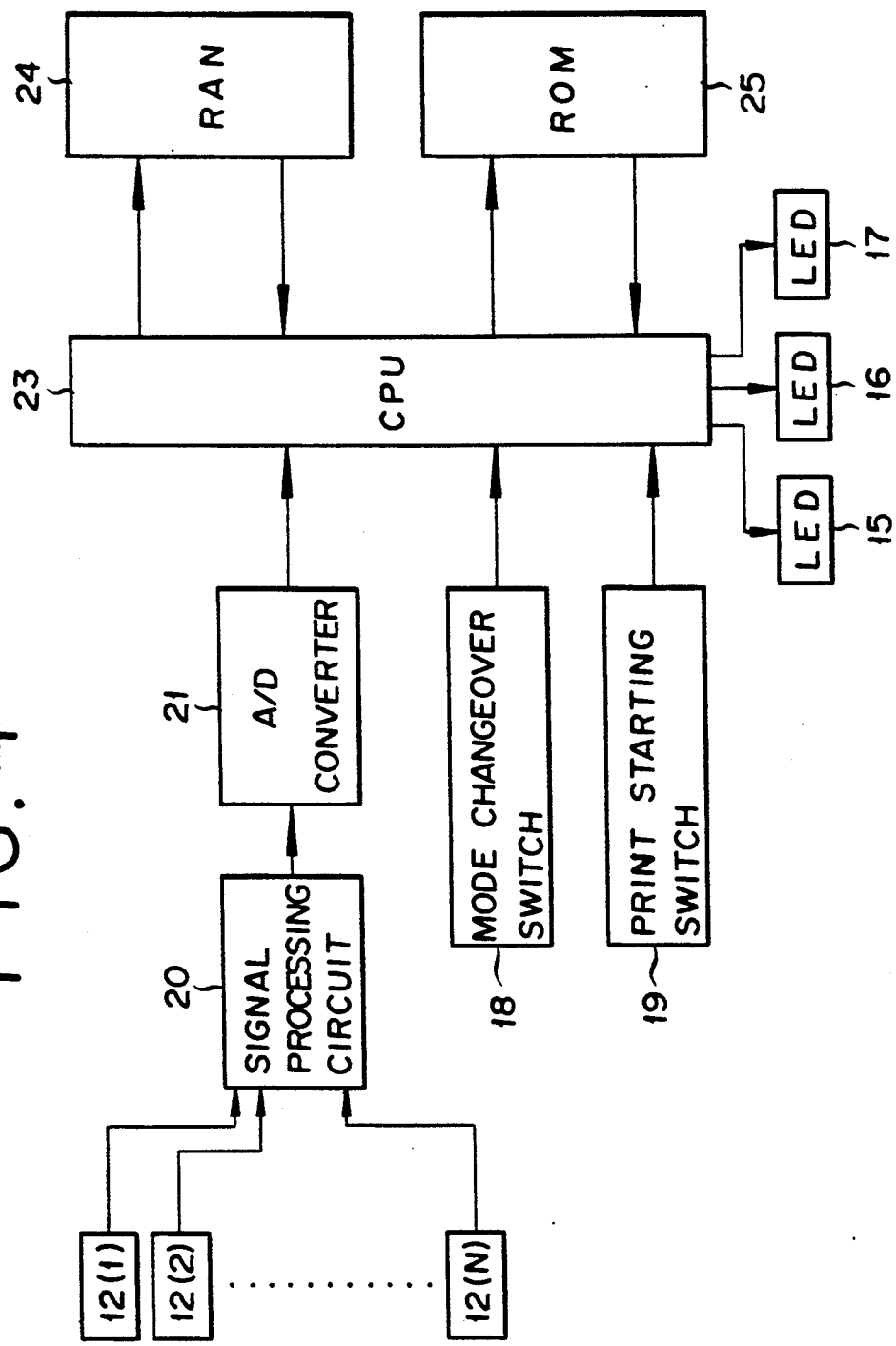

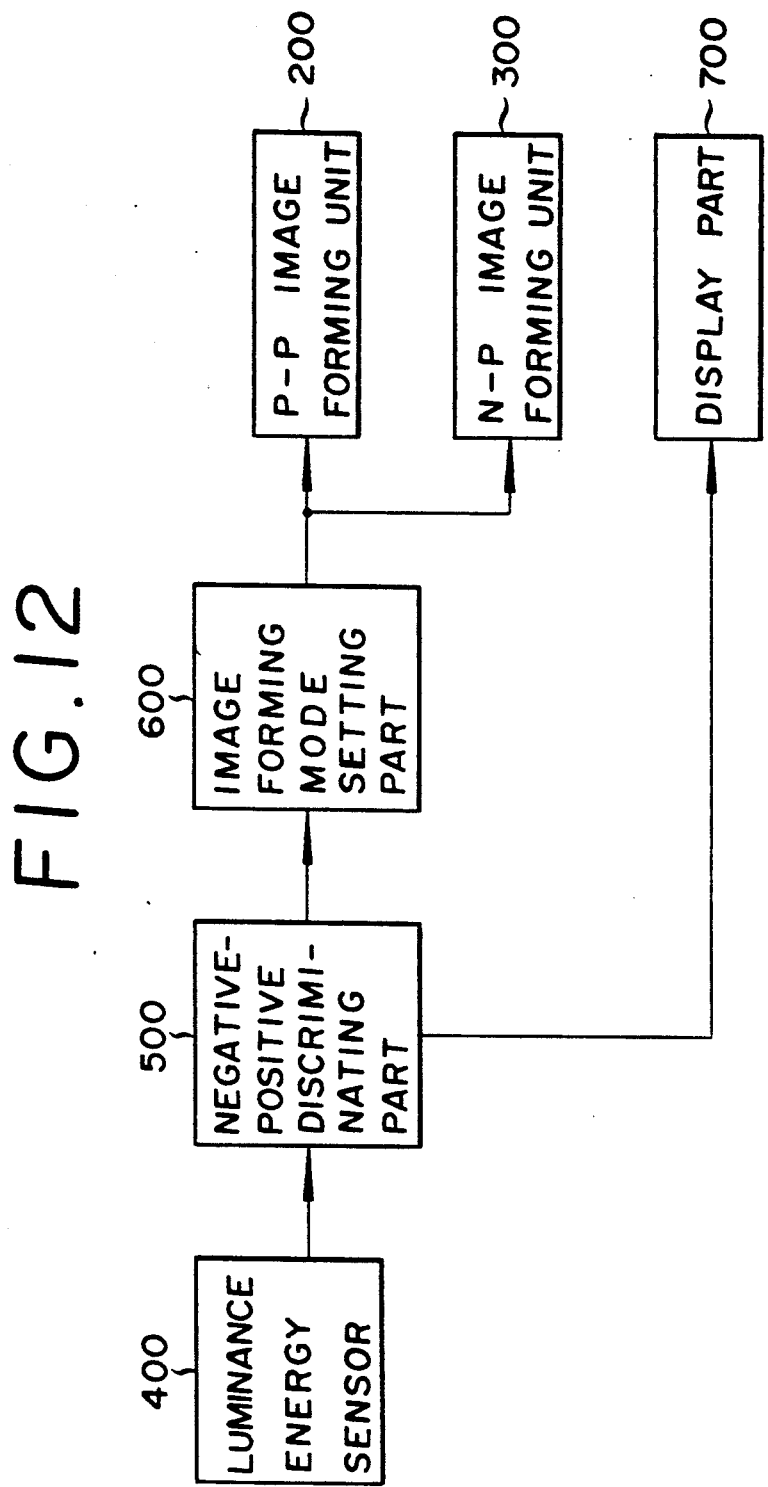

IMAGE FORMING APPARATUS

This application is a continuation, of application Ser. No. 07/487,251, filed Mar. 2, 1990 now abandoned.

BACKGROUND OF THE INVENTION

1. Field of the Invention:

This invention relates to an image forming apparatus. More particularly, this invention relates to a reader printer which automatically discriminates between a negative film and a positive film, whichever has been put to use therein, and reproduces a positive image from the film in use on a recording paper.

2. Description of the Prior Art:

An image recording apparatus or a reader printer installed as in a library is more often than not charged indiscriminately with negative films and positive films. As concerns the discrimination of films by their kind, it is a common practice for an operator of the reader printer to use a given film to obtain a positive image from a negative film or a positive image from a positive film after he has judged whether the given film is a negative film or a positive film. The judgment of this nature is not necessarily easy when the operator is not accustomed thereto. There is the possibility of the operator committing an error in judging the kind of film and consequently miscopying the film by proceeding to reproduce an image of the film. In case where one operator of the reader printer produces a copy from negative film and a next operator of the same reader printer produces a copy from a positive film, if the latter operator forgets to set the kind of film, he is certain to miscopy his film because of wrong mode of image formation. In the circumstances, reader printers capable of automatically discriminating between positive films and negative films and copying a given film correctly have been longed for and proposed.

In the conventional reader printers vested with a function to effect automatic discrimination between negative films and positive films, that which is disclosed in Japanese Patent Publication 63-10,410 has been renowned. The reader printer taught by this patent publication is provided with a mode changeover switch for switching between the N-P mode for reproducing the image of a negative film as a positively copied image and the P-P mode for reproducing the image of a positive film as a positively copied image and a photoelectric transducer for admitting a light traveling through a given film and emitting a voltage signal in response to the incident light. By the output signal from the photoelectric transducer, this reader printer judges whether the original image is recorded in a negative film or a positive film. The mode changeover switch is automatically actuated in accordance with the signal from the photoelectric transducer. When a given film is judged as not discriminable, the mode changeover switch is allowed to be manually switched.

Since the films given to be handled for copying are widely varied in kind, such conventional reader printers as described above have the possibility of committing an error in effecting automatic discrimination of films by kind. Further, they have not been capable of displaying to their operators the kind of film found by automatic discrimination and the image forming mode used. When the operator is required manually to set again the mode proper to the kind of film, therefore, he is compelled to take a look at the film and draw the judgment personally.

In case where the mode is to be manually set again based on the discrimination between a negative film and a positive film, there is the possibility of the operator erroneously setting the mode once again. In this case, the production of a desired copy may possibly entail occurrence of two miscopied sheets. Thus, the conventional reader printers have suffered from very poor efficiency and conspicuous inconvenience of operation.

SUMMARY OF THE INVENTION

A primary object of this invention, therefore, is to provide an image recording apparatus which is enabled to minimizes the chance of incorrect copying and enjoys operational efficiency by setting an image forming mode different from that of the preceding cycle of copying or displaying the image forming mode of the preceding cycle when the automatic discrimination of the kind of film occurs incorrectly and gives rise to incorrect copying.

In accordance with the present invention, there is provided an image forming apparatus for forming on a sheet an image recorded in a microfilm, which comprises; first image forming means for forming a positive image from a positive film; second image forming means for forming a positive image from a negative film; discriminating means for discriminating whether a given microfilm is a negative film or a positive film; first image forming mode setting means for selectively setting either of said first and second image forming means in response to the outcome of the discrimination by said discriminating means; and second image forming mode setting means for switching the image forming means set by said first image forming mode setting means to the other image forming means.

In the image recording apparatus of this invention, when the automatic discriminating mode is set, the image forming mode is switched by a key input to that which is different from the mode of the preceding cycle after the copying of the preceding cycle is completed. As a result, the image forming unit opposite that of the preceding cycle is set and operated to produce a correct copy even when the chance of miscopying occurs in consequence of incorrect judgment.

Further, in the image recording apparatus of this invention, in the judgment of the kind microfilm, the discrimination between a negative film and a positive film is automatically effected by means for a luminous energy sensor. The image forming mode is determined by the result of this discrimination and, at the same time, the result of the discrimination is displayed on a display. The operator of the image recording apparatus, therefore, is allowed to discern which of the image forming modes is to be used in the copying of a given film.

BRIEF DESCRIPTION OF THE DRAWINGS

FIG. 4 is a block diagram illustrating a control circuit of the reader printer;

FIG. 12 is a block diagram illustrating as function realizing means a schematic configuration of an image forming apparatus as the second embodiment of this invention.

DESCRIPTION OF THE PREFERRED EMBODIMENTS

Figure 1:
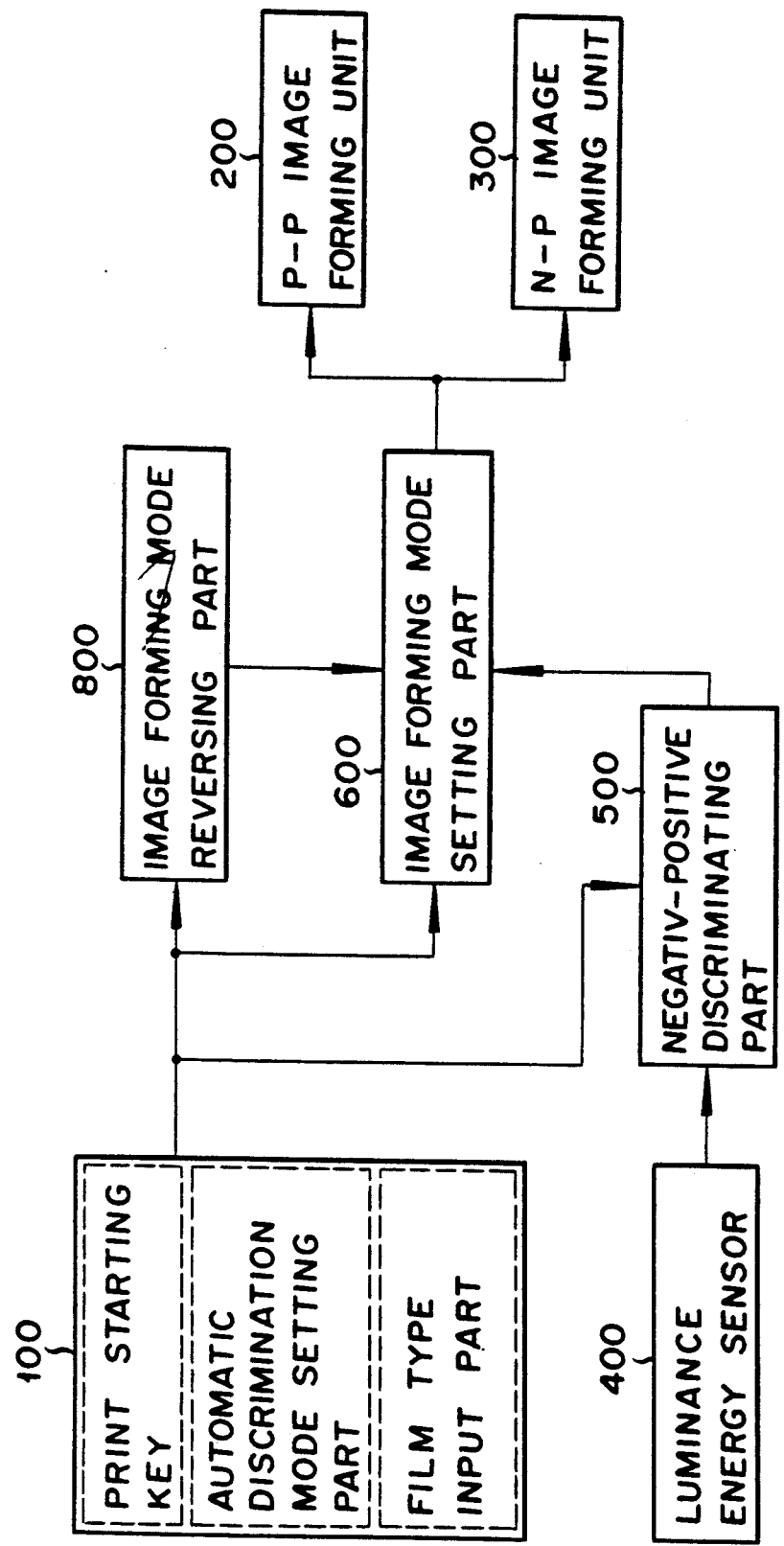
FIG. 1 is a block diagram illustrating as function realizing means a schematic configuration of a typical image forming apparatus as the first embodiment of this invention.

FIG. 1 is a schematic diagram illustrating the basic configuration of a typical reader printer embodying the present invention. A key input part 100 incorporated in the reader printer is composed of a print starting key, an automatic discrimination mode setting part for setting the reader printer at an automatic discrimination mode for automatically discriminating whether a charged microfilm is negative film or a positive film, and a type of film input part for effecting external input of the outcome of discrimination between a positive film and a negative film. The reader printer also incorporates a P-P image forming unit 200 for reproducing as a positive image an image recorded in a positive film and a N-P image forming unit 300 for reproducing as a positive image an image recorded in a negative film. The discrimination whether a charged microfilm is a positive film or a negative film is accomplished by a luminance energy sensor or photoelectric transducer 400 for evaluating the light traveling through the image part of the microfilm and emitting an electric signal corresponding to the luminance energy of the incident light and a negative-positive discriminating part 500 for identifying the kind of the microfilm based on the output signal from the photoelectric transducer 400. In accordance with the outcome of the discrimination made by the discriminating part 500, an image forming mode setting part 600 sets an image forming mode conforming to the kind of the microfilm and actuates either of the two image forming units. Optionally by externally operating the film type input part of the aforementioned key input part 100, the image forming units may be selectively actuated by the image forming mode setting part 600. In case where the film type input part of the key input part 100 is operated after the image recorded in the microfilm is reproduced on a recording sheet while the reader printer is under an automatic discrimination mode, an image forming mode reversing part 800 switches the reader printed from the image forming mode of the preceding cycle to an opposite image forming mode.

Figure 2:
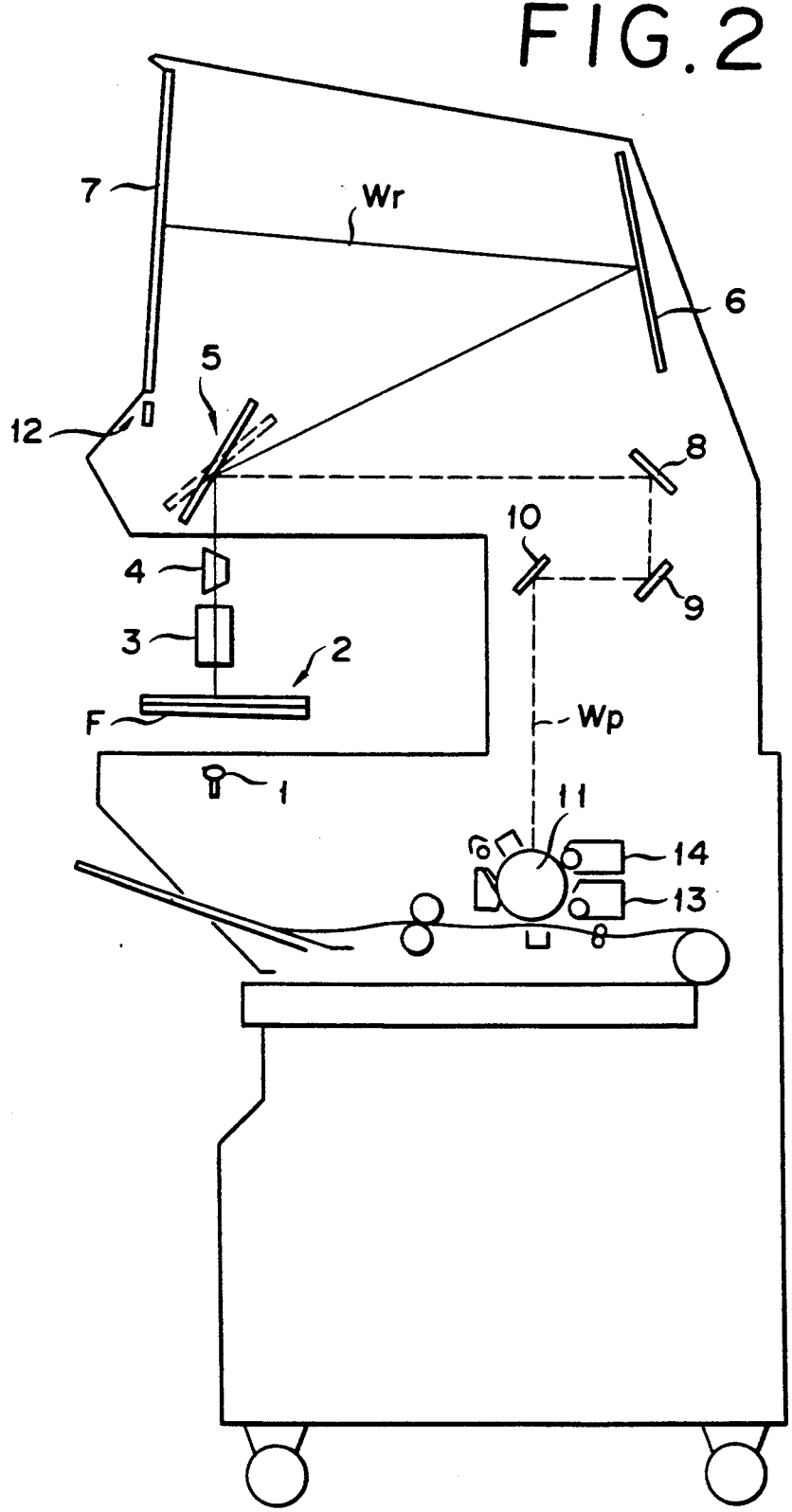
FIG. 2 is a schematic cross section illustrating the internal structure of a reader printer as one embodiment of this inventions.

FIG. 2 is a schematic cross section illustrating the internal structure of the reader printer. In FIG. 2, the reference numeral 1 denotes a light source or an exposure lamp and the reference numeral 2 a carrier for a microfilm disposed above the light source. This carrier 2 comprises two pressure glasses adapted to nip there between a microfilm or a microfiche F. This film F has negative images or positive images recorded one each in a prescribed number of image frames. Directly above the carrier 2 are disposed a projecting lens 3 and a prism 4.

Directly above the prism 4, a movable mirror 5 adapted to be freely swung around an axis (not shown) extending perpendicularly to a light path composed of the light source 1, the carrier 2, the projecting lens 3, and the prism 4 is disposed. When the movable mirror 5 is in the state held at the first position indicated by a continuous line in FIG. 2, the light from the light source 1 constitutes a reader light path Wr extended through a stationary mirror 6 to a screen 7.

When the movable mirror 5 is held at a second angular position indicated by a broken line in the diagram, the light from the light source 1 is led through the medium of stationary mirrors 8, 9, and 10 and passed through an exposure slit to a photosensitive drum 11 as an image recording part. The broken line in the diagram indicates a printing light path Wp.

The light paths Wr and Wp which are formed respectively during the reader mode for projecting images recorded in the microfilm on the screen 7 and during the print mode for reproducing the image on a copying paper share the movable mirror 5. By the swing of the movable mirror 5, the switch between these light paths is accomplished. During the print mode, the movable mirror 5 is rotated at a prescribed speed so that the scanning speed of the permeating light from the light source led among the printing light path wp to the photosensitive drum 11 is synchronized with the peripheral speed of the photosensitive drum 11. Directly below the screen 7 is disposed closely thereto a photoelectric transducer assembly 12 composed of a plurality of photoelectric transducer elements.

The image recording part has a well-known configuration, having an electric charger, an erasing lamp, a cleaning unit, a transfer charger, a developing unit (N-P developing unit) 13 for use in reversal development, and a developing unit (P-P developing unit) 14 for normal development disposed closely to the peripheral surface of the photosensitive drum 11.

The process for the formation of an image on a copying paper starts with a step of electrically charging the photosensitive drum 11 by means of the electric charger and exposing the peripheral surface of the photosensitive drum 11 to the light projected through a given image thereby forming an electrostatic latent image on the peripheral surface. In case where the microfilm F is a positive film, the electrostatic latent image is reproduced as a sensitive image on the copying paper by the normal development owing to the operation of the P-P developing unit 14. Where the microfilm F is a negative film, the conversion of the electrostatic latent image to the sensible image is effected by the reversal development to be performed by the N-P developing unit 13. The next step consists in transferring the sensible image on the peripheral surface of the photosensitive drum 11 onto the copying paper by virtue of the transfer charger. The transferred image on the copying paper is fixed by a fixing unit. The part of the toner or developer which has escaped being transferred onto the copying paper is recovered by the cleaning unit and the photosensitive drum 11 is deprived of charge by the erasing lamp.

Figure 3:
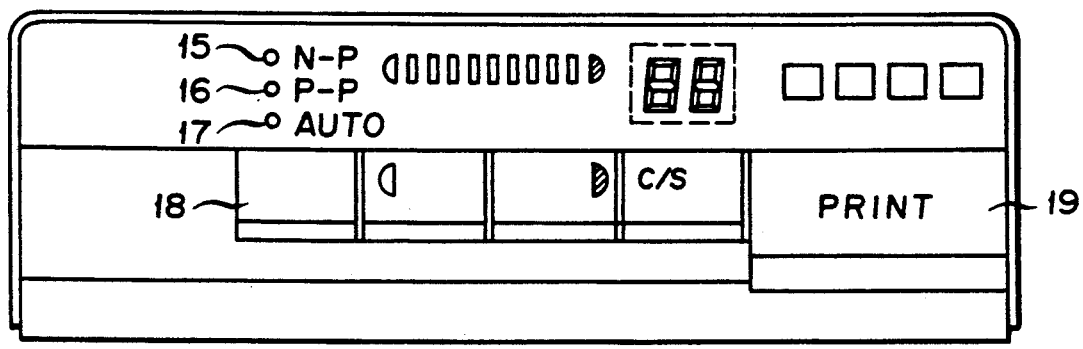
FIG. 3 is a plan view illustrating an operating panel disposed on the reader printer shown in FIG. 2.

FIG. 3 illustrates an operating panel consisting of an operating part and a display part for the reader printer. In FIG. 3, the reference numeral 15 denotes a display lamp for indicating the N-P image forming mode, the reference numeral 16 a display lamp for indicating the P-P image forming mode, and the reference numeral 17 a display lamp for indicating an N/P automatic discrimination mode. These display lamps are invariably formed of LED's. The reference numeral 18 denotes a mode changeover switch and the reference numeral 19 a print starting switch.

This reader printer, as inferred from the display lamps disposed on the operating panel shown in FIG. 3, is intended for selective operation in the three modes, i.e. the automatic discrimination mode for automatic discrimination between a negative film and a positive film, the N-P mode for manual operation, and the P-P mode for manual operation. The operational modes are switched in the rotational order of the N-P mode, the P-P mode, and the AUTO mode and the LED 15 for displaying the N-P mode, the LED 16 for displaying the P-P mode, and the LED 17 for displaying the AUTO mode are selectively lighted in conformity to the selected mode each time the mode changeover switch 18 is depressed.

FIG. 4 is a block diagram illustrating a control circuit of the reader printer. As illustrated, the photoelectric transducer assembly 12 is composed of a plurality (N) of photoelectric transducer elements or photodiodes denoted by the reference numerals 12 (1) to 12 (N). The photoelectric transducer assembly 12 make up the luminance energy sensor 400 shown in FIG. 1. The photoelectric transducer assembly 12 is connected via a signal processing circuit 20 and an A/D converter 21 to a microcomputer (CPU) 23. To the CPU 23 are connected a RAM 24 and a ROM 25. They make up the negative-positive discriminating part 500, the image forming mode setting part 600, and the image forming mode reversing part 800 illustrated in FIG. 1.

The film kind changeover switch 18 and the print starting switch 19 illustrated in FIG. 4 make up the key input unit 100 shown in FIG. 1.

Now, the procedure for copying an image with the reader printer in the AUTO mode will be described below. The setting of the AUTO mode is attained by depressing the mode changeover switch 18. The LED 17 on the operating panel is set glowing when this mode is selected.

When the print switch 19 is turned on in the ensuant state of the reader printer, the exposure lamp 1 is lighted and the movable mirror 5 is swung from the position indicated by the continuous line to the position indicated by the broken line illustrated in FIG. 2 to produce a motion for measuring light and effect discrimination of the kind of film prior to starting a motion for the formation of image. During the operation of light measurement, the magnified image of the film F projected on the screen 7 is sequentially projected on the photoelectric transducer assembly 12. The luminance energies of the magnified image of the film F projected on the component elements 12 (1) to 12(N) are converted into electric signals (analog signals) and then forwarded via the signal processing circuit 20 to the A/D converter 21, there to be converted into digital signals.

These digital values are delivered through a data bus to the CPU 23. The CPU 23, based on the digital values obtained by the photoelectric transducer elements 12 (1) to 12 (N), renews the data in the areas of the RAM 24 set in advance one each for the component elements.

Figure 6:
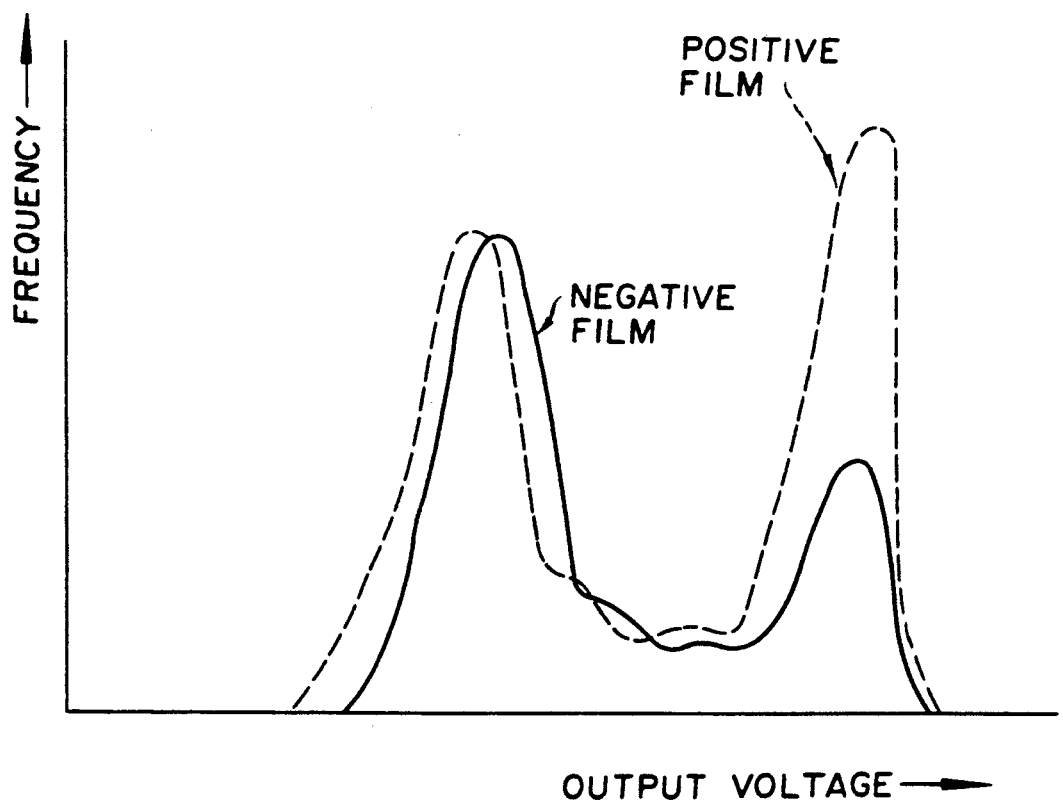
FIG. 6 is a histogram showing the relation between the output and the frequency of a photoelectric transducer element in the automatic discrimination processing.

When the output voltages of the film impinging on the RAM 24 correspondingly to the photoelectric transducer elements 12 (1) to 12 (N) are small at the end of the operation of light measurement, the curve of a histogram is as shown by the continuous line in FIG. 6 in the case of a negative film. The curve is as shown by the broken line in FIG. 6 conversely in the case of a positive film. Since the photoelectric transducer assembly is composed of N photoelectric transducer elements, the CPU 23 effects the judgment on whether the curve of the histogram obtained of each of the component elements is negative (continuous line of FIG. 6) or positive (broken line of FIG. 6) N times. In this case, the CPU 23 omits the judgment on the curve of histogram which defies clear discrimination of kind of film. After the discrimination of the signals from the individual component elements is completed, the microfilm is judged to be a negative film where the number of discriminations favoring a negative film is larger or to be a positive film where the number of discriminations favoring a positive film is larger.

Figure 5A:
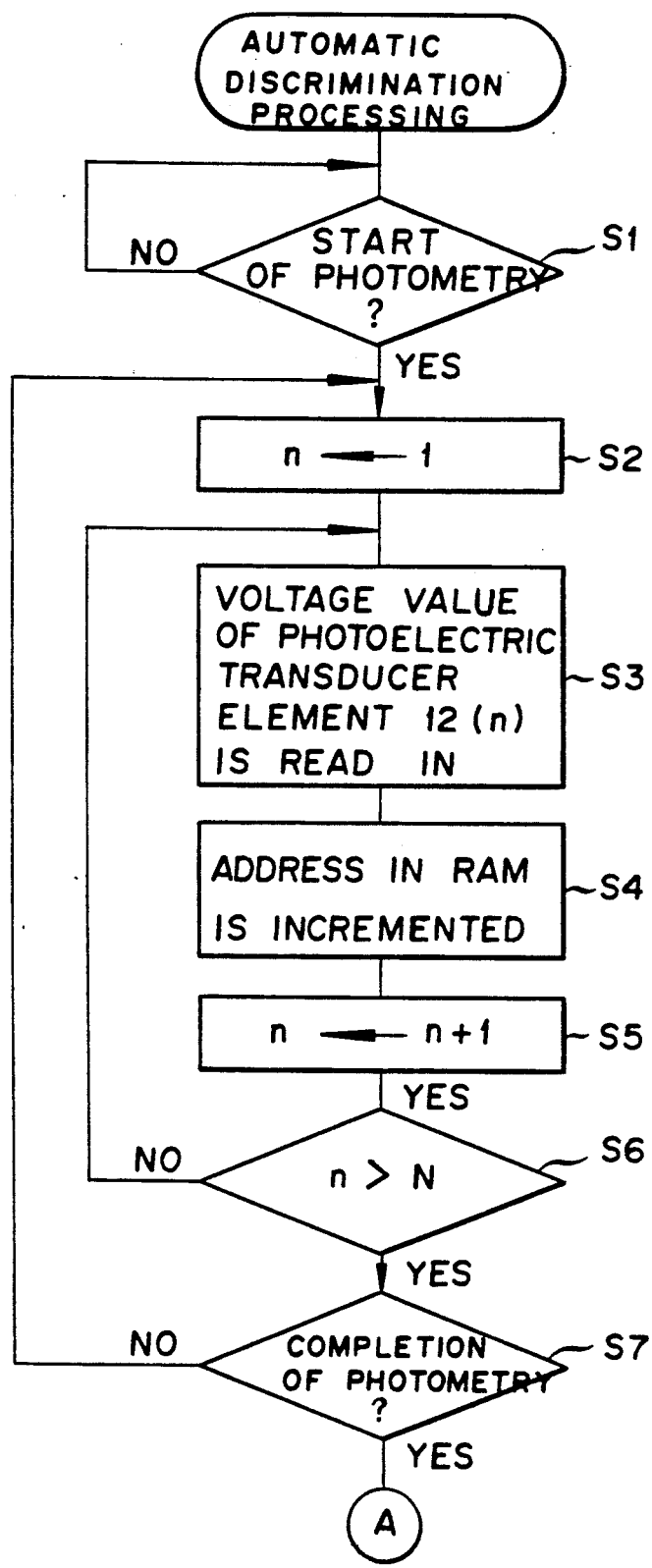
FIG. 5A and FIG. 5B are flow charts each showing a routine of an automatic discrimination processing for automatically discriminating whether a given microfilm is a negative film or a positive film.
Figure 5B:
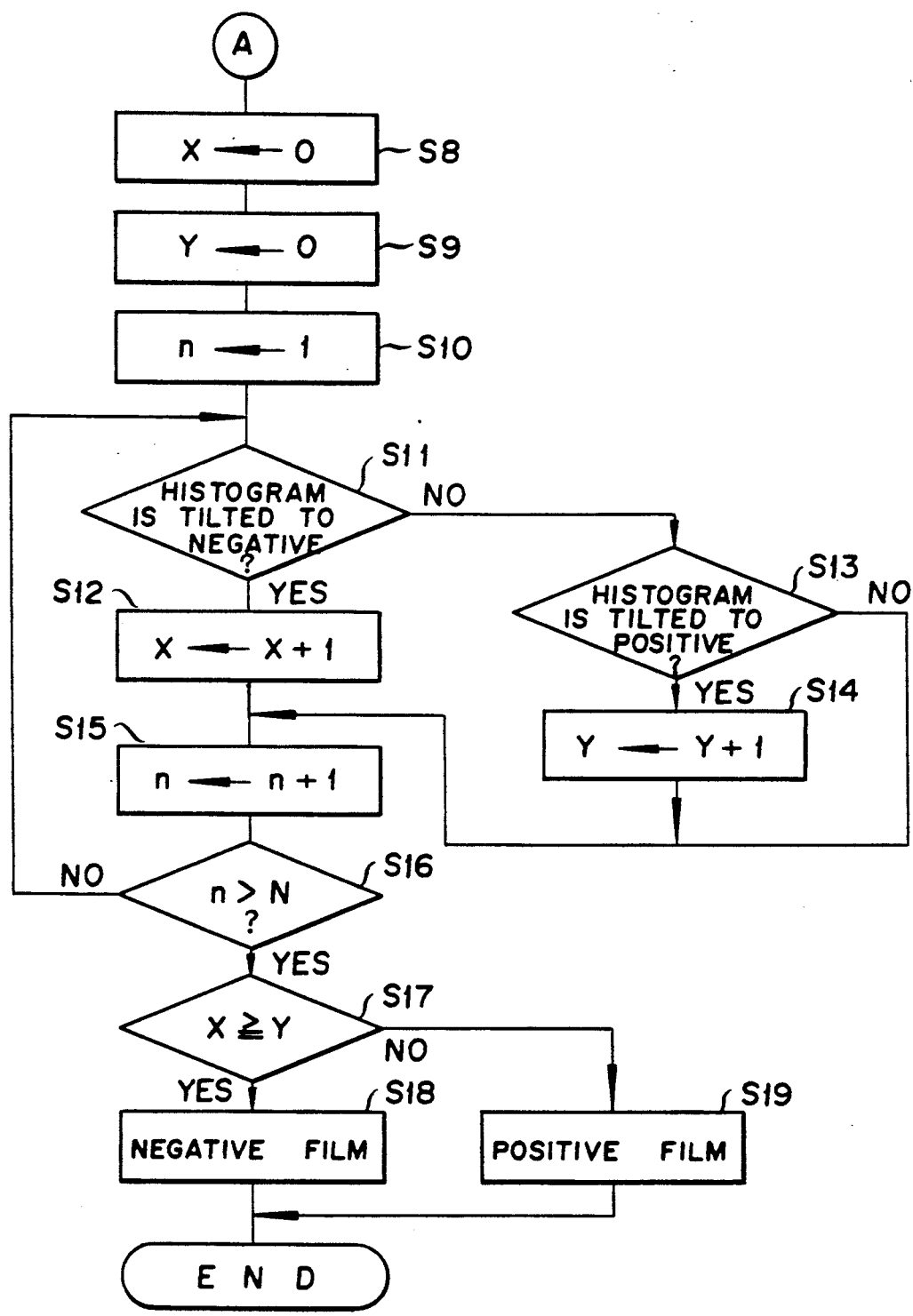

FIG. 5 is a flow chart illustrating a control program for the automatic discrimination processing to be performed to determine whether the charged microfilm is a negative film or a positive film.

When the start of light measurement is discerned at Step S1, the processing advances to Step 2, in which the numeral 1 is substituted for the variable n. At Step 3, the value of voltage of the individual photoelectric transducer elements 12 (n) (n=1,2,---N) is read in and stored in the RAM 24. At Step S4, the content of the address in the RAM 24 is incremented by one corresponding to the input value. At Step S5, an increment of n is admitted. At Step S6, comparison is made between n and N. Where n>N, namely the introduction as input of the values of N photoelectric conversion elements 12 (1) to 12 (N) is judged to have been completed, the processing advances to Step S7. When NO results from the discrimination at Step S6, the processing returns to Step S3. The discrimination whether the light measurement has been completed or not is carried out at Step S7. Where the discrimination draws a negative answer, the processing returns again to Step S2. In other words, by repeating the processing at Step S2 through Step S7 until the light measurement is completed, N histograms one each for the photoelectric transducer elements 12 (1) to 12 (N) are formed within the RAM 24. When the completion of light measurement is discerned at Step S7, the processing advances to Step S8, wherein the counter X is initialized to zero. Then, the processing advances to Step S9, wherein the counter Y is initialized to zero. Further, at Step S10, the numeral 1 is substituted for the variable n. At Step S11, the discrimination whether the curve of histogram is tilted toward negative film or not is effected. The processing proceeds to Step S12 when the discrimination draws YES as an answer. Otherwise, the processing advances to Step S13. At Step S12, the counter X admits an increment and carries out Step S15. At Step S13, a judgment is made as to whether the curve of histogram is tilted toward a positive film or not. When the judgment draws an affirmative answer, the counter Y admits an increment at Step S14 and Step S15 is executed. At Step S15, an increment of n is admitted. Comparison of n with N is executed at Step S16. Where n>N is established at Step S16, this means that a total of n judgments have been completed. Consequently, Step S17 is executed and the counters X and Y are compared at this Step S17. Thus, the judgment as to whether the microfilm is a negative film or a positive film. Where $X \leq Y$ is established, the judgment favors a negative film at Step S18. Where X<Y is established, the discrimination favors a positive film at Step S19.

As described above, the identification of the kind of microfilm is attained in the automatic discrimination mode. Where the microfilm is judged to be a negative film, the copying of a positive image is attained by the N-P developing unit 13. Where the microfilm is judged to be a positive film, the copying is attained by the P-P developing unit 14.

Figure 7:
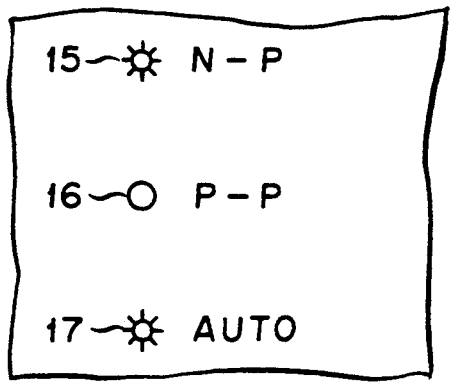
FIGS. 7 to 10 are plan views illustrating lighting patterns of a LED in varying modes of the operating panel.

FIG. 7 illustrates part of the operating panel on which the LED's 15 and 17 are lighted in consequence of the judgment favoring a negative film.

Figure 8:
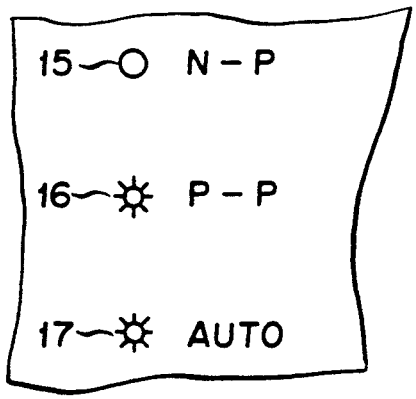

FIG. 8 illustrates a part of the operating panel on which the LED's 16 and 17 are lighted in consequence of the judgment favoring a positive film. While the reader printer is operated in the automatic discrimination mode, the LED's mentioned above continue to glow between the time the automatic discrimination processing is completed and the identification of the kind of film is accomplished and the time the copying is completed. The glowing of these LED's enables the operator to discern the image forming mode resulting from the discrimination.

Figure 9:
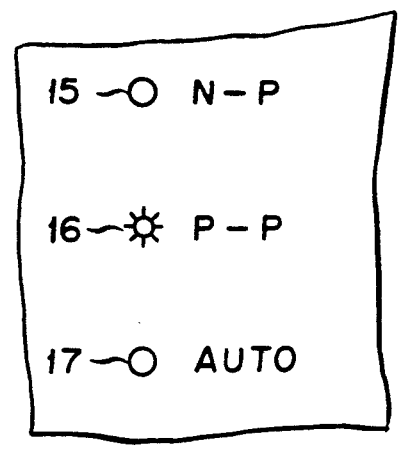
Figure 10:
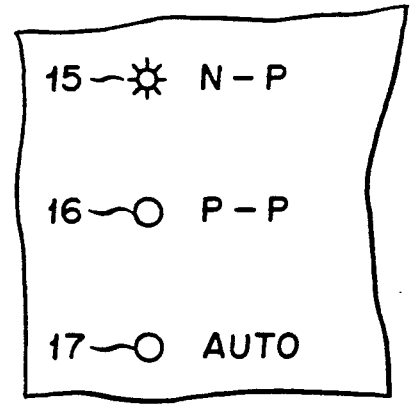

When the print switch 19 is turned on after the P-P mode has been selected by the mode changeover switch 18, the LED 16 is lighted as illustrated in FIG. 9. The LED 15 is lighted as illustrated in FIG. 10 when the print switch 19 is turned on after the N-P mode has been selected.

Now, the case of incorrect discrimination possibly involved in the automatic discrimination mode will be explained below. The incorrect discrimination is discerned by an operator of the reader printer taking a look at the image on the produced copy.

In this case, the operator once more turns on the mode changeover switch 18 now held in the state illustrated in FIG. 7 or FIG. 8. As a result, the panel displays are changed to those illustrated in FIG. 9 or FIG. 10. Specifically, when the judgment favoring a negative film is found to have been a wrong judgment, the displays change from those shown in FIG. 7 to those shown in FIG. 9, with the mode switched to the P-P mode. Conversely, when the automatic discrimination favoring a positive film is found to have been a wrong judgment, the displays shown in FIG. 8 are switched to those shown in FIG. 10, with the mode switched to the N-P mode. Whenever an incorrect judgment takes place as described above, the image forming mode of the preceding cycle is changed over to the opposite image forming mode to ensure production of a correct copy. Thus, the operator is not required to discern the image forming mode used in the preceding cycle.

Figure 11A:
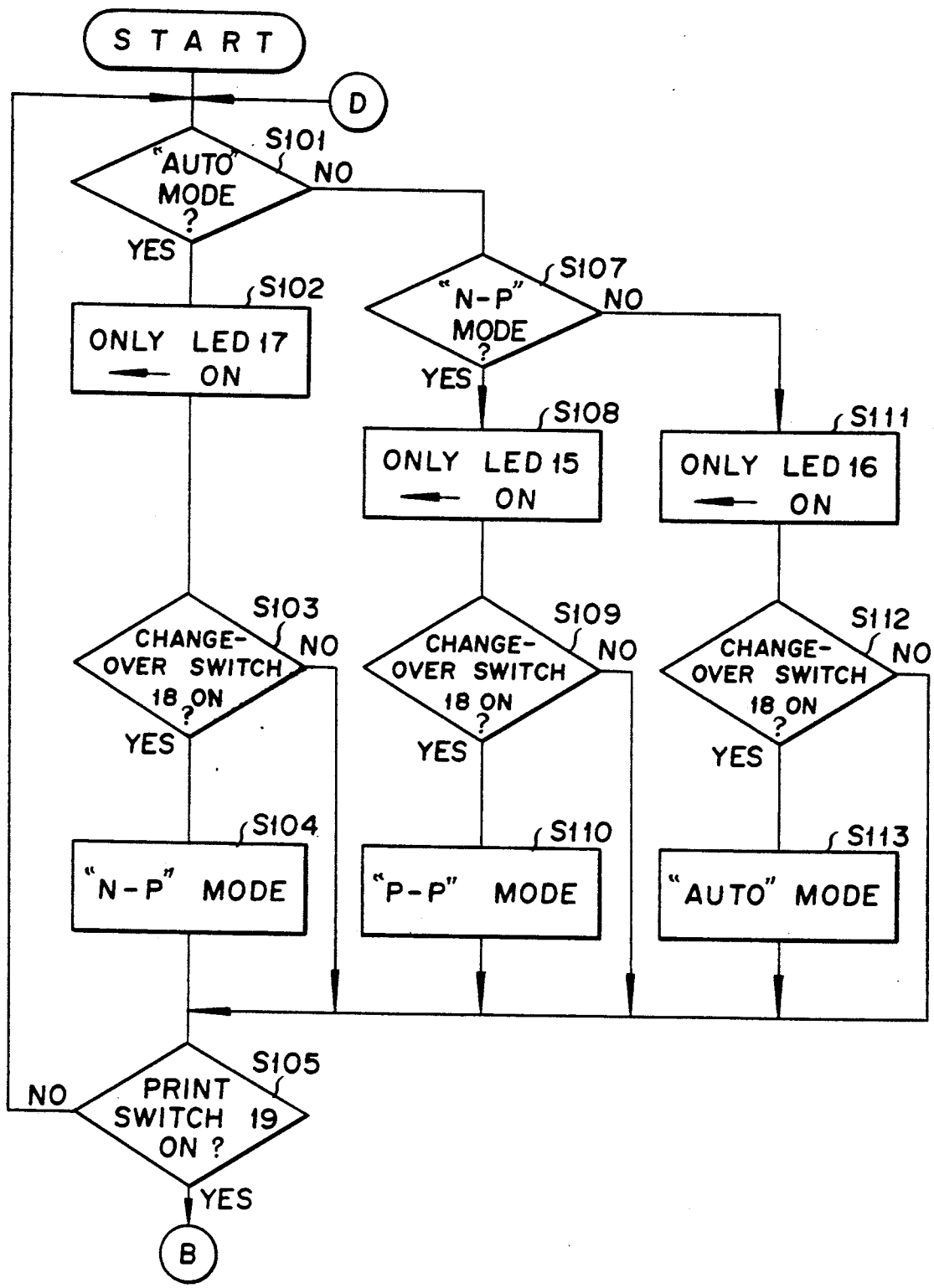
FIGS. 11A to 11C are main flow charts illustrating the procedure for controlling the reader printer.
Figure 11B:
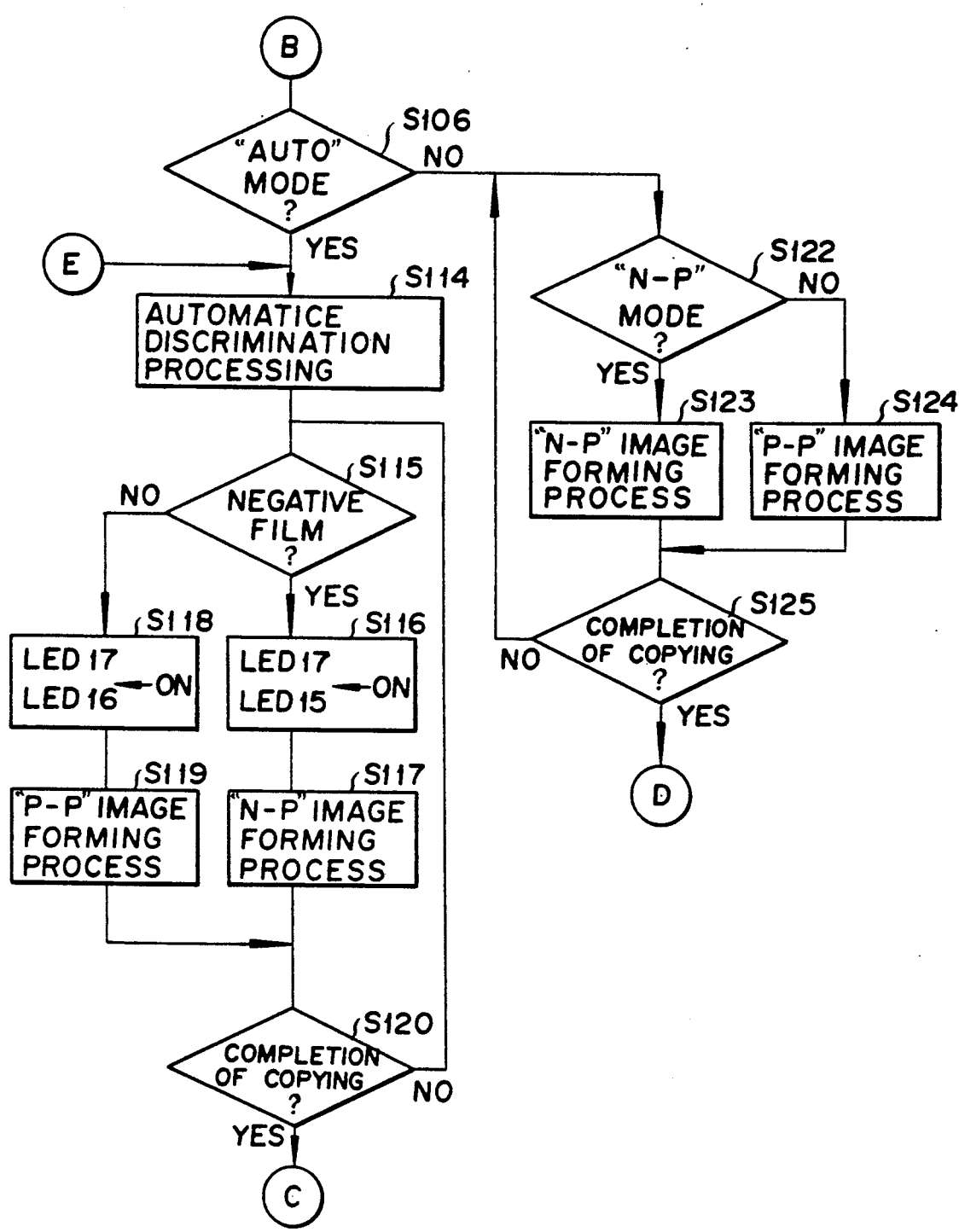
Figure 11C:
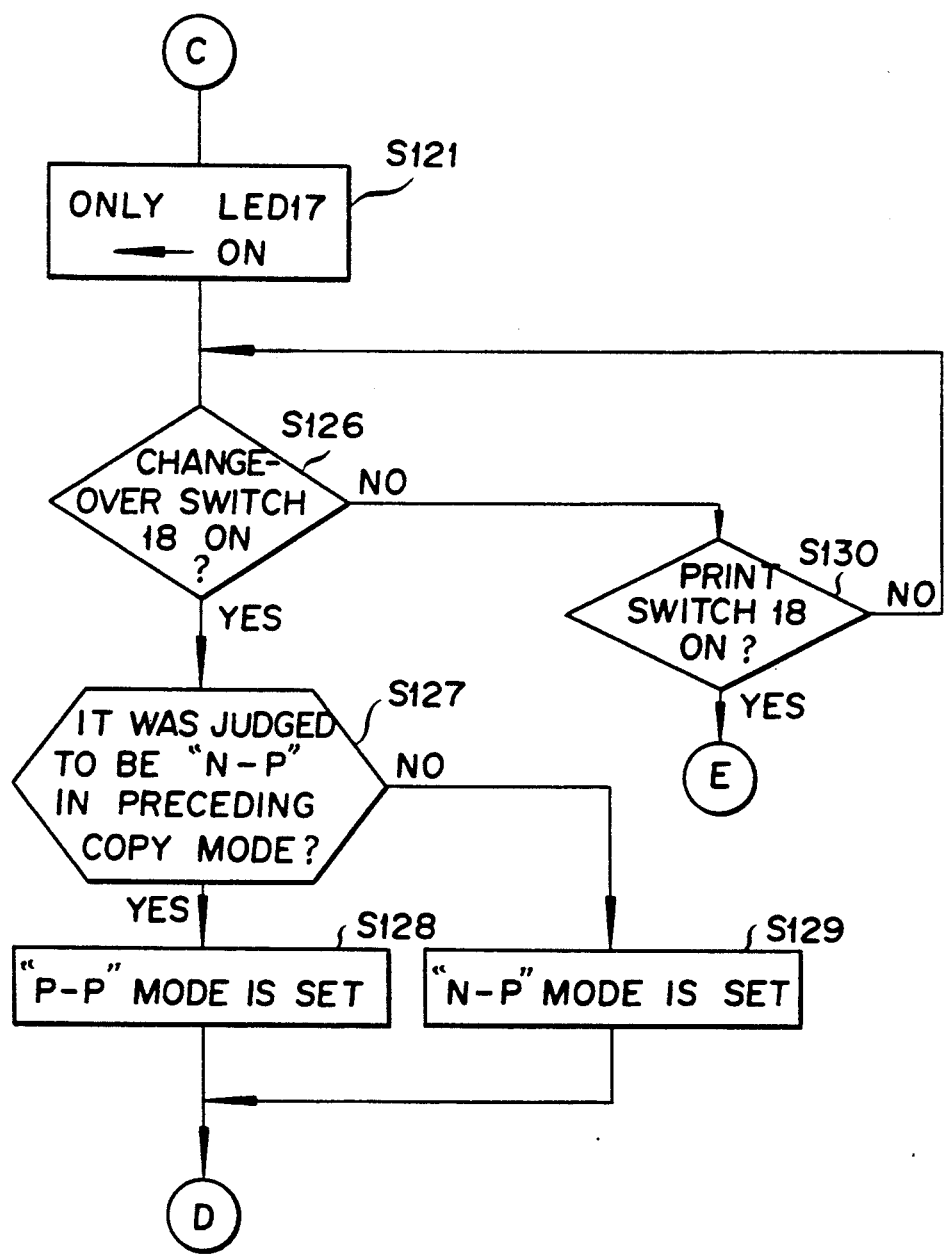

FIG. 11 is a main flow chart showing the control program of the reader printer.

At Step S101, judgment is made as to whether the mode set in the initial state is the AUTO mode namely the automatic discrimination mode or not. When the judgment draws YES as an answer, the LED 17 alone for displaying the AUTO mode is lighted at Step S102. At Step S103, judgment is made as to whether the mode changeover switch 18 is turned on or off or whether the switch 18 has been depressed or not. When the judgment draws YES as an answer, the kind identification mode is switched to the N-P mode at Step S104. At the next Step S105, judgment is made as to whether the print switch 19 has been depressed or not. The proceeding is returned to Step S101 when the judgment draws NO as an answer or advanced to Step S106 when the judgment draws YES as an answer.

When the judgment at Step S101 draws NO (indicating that the manual mode has been set) as an answer, Step S107 is executed to made judgement as to whether the kind identification mode is N-P mode or not. When the existence of the N-P mode is established by the judgment at Step S107, the LED 15 alone is lighted at Step S108. Then, at Step S109, judgment is made as to whether the mode changeover switch 18 has been turned on or not. When the depression of this switch 18 is established by this judgment, Step S110 is executed to which the image forming mode to the P-P mode. Conversely, when the absence of this depression of the switch is established, Step S105 is executed.

When the judgment at Step S107 draws NO (indicating that the P-P mode has been set) as an answer, Step S111 is executed to light only the LED 16. At Step S112, discrimination between the ON and OFF states of the mode changeover switch 18 is effected. When the judgment favors the ON state, Step S113 is executed to set the AUTO mode. Thereafter, Step S105 is executed without reference to the outcome of the discrimination.

At Step S106, judgment is made as to whether the AUTO mode is present or not. The automatic discrimination processing is carried out at Step S114 when the presence of the AUTO mode is established by the judgment. This automatic discrimination processing is performed by the sub-routine shown in FIG. 5.

At Step S115, judgment is made as to whether the identification of a negative film has been attained or not. When NO is drawn as an answer, the LED 17 and the LED 15 are simultaneously lighted at Step S116. This state corresponds to that which is illustrated in FIG. 7. Then at Step S117, the N-P image forming process is carried out. Conversely, when the judgment at Step S115 favors a positive film and not a negative film, the LED 16 and the LED 17 are simultaneously lighted at Step S118. This state corresponds to that which is illustrated in FIG. 8. Further, at Step S119, the P-P image forming process is executed.

When the completion of copying is judged at Step S120 after the execution of either of the image forming processes mentioned above is completed, the LED 17 alone is lighted at Step S121 and Step S126 is executed. When the completion of copying is denied, the processing is returned to Step S115.

When the presence of the AUTO mode is denied by the judgment at Step S106, judgment is made at Step S122 as to whether the N-P mode is present or not. The N-P image forming process is executed at Step S123 when the presence of the N-P mode is established by the judgment. The P-P image forming mode is executed at Step S124 when the presence of the N-P mode is denied by the judgment. After Steps S123 and S124 have been executed, judgment is made as to whether the copying has been completed or not. When YES is drawn as an answer, the processing is returned to Step S101. When NO is an answer, the processing is returned to Step S122. Steps S122 through S125 are followed when the copying is obtained in the manually set mode.

When the mode changeover switch 18 allows three modes to be switched in a rotational order as described above, after the copying in the AUTO mode has been completed, namely after the execution of Step S121 has been completed, the operator visually examines the recording paper used in copying to determine whether the copy has been produced in a correct mode or not. If the operator judges that the image has been formed in a wrong mode, he eliminates the defective state by a key input. Specifically, this correction is attained by the operator depressing the mode changeover switch 18 just once.

When the judgment as to whether the mode changeover switch 18 has been turned on or not draws YES as an answer at Step S126, the copy from the preceding cycle is examined to determine whether the copying has been made from a negative film or not. When the use of a negative film is established by this determination, the switch to the P-P mode is effected as at Step S128.

Conversely, when the use of a positive film is established by the examination at Step S127, the N-P mode is set at Step S129. The processing is returned to Step S101 after either of Steps S128 and S129 is completed.

When the mode changeover switch 18 is not judged to be ON at Step S126, Step S130 is executed. The processing is returned to Step S114 when the print switch 19 is on at Step S130. It is returned to Step S126 when the print switch 19 is not on.

Though the preceding embodiment has been described as having one mode changeover switch 18 fulfill the combined function as an automatic discrimination mode setting part and a film identification input part, this combined function is not particularly critical for this invention. This invention can be embodied in a reader printer which is provided with a N-P mode selecting switch, a P-P mode selecting switch, and an AUTO mode selecting switch which independently of one another and also provided with displays corresponding to such selecting switches. In this case, when the AUTO mode selecting switch is depressed immediately after the printing by the automatic discrimination is completed, the AUTO mode is canceled and the image forming mode selected by the automatic discrimination is reversed. Optionally, the reader printer may be so configured that the sole selection of the opposite image forming mode will be attained by inhibiting the use of the image forming mode selecting switch selected in the immediately preceding cycle or precluding the entry thereof.

In another embodiment, the reader printer of this invention may incorporate an automatic discrimination mode selecting switch and an identification mode reversing switch and displays corresponding to the switches, so that the key input to the identification mode reversing switch is inhibited in the normal case and the key input is admitted only after the copying in the automatic discrimination mode is completed. The input by the reversing switch may be used as an input key in case of incorrect discrimination.

In the embodiment, the reader printer has been described as being provided both with the image forming mode reversing part 800 and the display part 700. Optionally, the reader printer may be provided only with either of these two parts. When the reader printer is provided with the display part 700, it is capable of identifying the image forming mode selected by the automatic discrimination. Thus, the operator is allowed to set the opposite image forming units with ease. The control program for the purpose of this reader printer may be such that, in the flow chart illustrated in FIG. 11, the processing will be returned to Step S101 when the copying is completed at Step S120.

Further, the ideal timing of setting the display part 700 may be after completion of the copying confirmed by visual confirmation of the release of the copied recording paper in the discharge paper tray or at the time that the new input of the mode changeover switch 18 is made, for example.

In the illustrated embodiment, the N-P mode and the P-P mode are so adapted as to reproduce a positive image by switching between two corresponding developing units relative to the latent image of either of the polarities. When the reader printer is configured to effect required reversal of the polarity of the latent image by the use of a bipolar photosensitive material, the reproduction of a positive image can be accomplished by effecting the switch between the N-P mode and the P-P mode with one developing unit.

FIG. 12 is a schematic diagram illustrating the basic configuration of a typical reader printer as another embodiment of this invention. This reader printer is provided with a P-P image forming unit 200 for reproducing as a positive image an image recorded in a positive film and a N-P image forming unit 300 for reproducing as a positive image an image recorded in a negative film. The discrimination as to whether a charged microfilm is a positive film or a negative film is accomplished by a luminance energy sensor 400 for evaluating the light traveling through an image part of the microfilm and emitting an electric signal in response to the luminous energy of the incident light and a negative-positive discriminating part 500 for discriminating the kind of the microfilm in accordance with the output signal from the luminance energy sensor 400. In accordance with the outcome of the discrimination made by the discriminating part 500, the image forming mode setting part 600 sets the image forming mode corresponding to the kind of the microfilm and resets either of the two image forming units operating and, at the same time, causes the outcome of the discrimination to be displayed on the display 700.

As described above, it suffices for the reader printer to be provided with either of the display part 700 and the image forming mode reversing part 800.

The reader printer provided with the display part 700 is capable of discerning the image forming mode selected in consequence of the automatic discrimination. The operator of this reader printer, therefore, is enabled to set the opposite image forming mode with ease. The control program for this reader printer may be such that, in the flow chart illustrated in FIG. 11, the processing will be returned to Step S101 when the completion of copying is judged at Step S120. The timing for turning off the display part 700 may be after completion of the copying confirmed by visual detection of the discharge of the copied recording sheet into the discharge paper tray or at the time that the new input of the next mode changeover switch 18 is made.

In any of the embodiments described above, the reader printer is so configured as to reproduce a positive image by proper switch between two developing units, one for the N-P mode and the other for the P-P mode, relative to the latent image of one polarity or the other. When the reader printer employs a bipolar photosensitive material, it enables a positive image to be reproduced on the recording sheet with one developing unit by reversing the polarity of the latent image and attaining a proper switch between the N-P mode and the P-P mode.

While the invention has been described with reference to the structures disclosed herein, it is not confined to the details set forth and this application is intended to cover such modifications or changes as may come within the purpose of the improvements or the scope of the following claims.

I claim:

1. An image forming apparatus comprising:

first image forming means for forming a positive image from a positive original image;

second image forming means for forming a positive image from a negative original image;

discriminating means for discriminating whether an original image is a negative image or a positive image;

first image forming mode setting means for selectively setting either of said first and second image forming means in response to the outcome of the discrimination by said discriminating means; and second image forming mode setting means for setting the image forming means which is not set by said first image forming mode setting means of the first and second image forming means, said second image forming mode setting means thereby enabling a user to avoid manually discriminating whether said original image is positive or negative in the event of incorrect discrimination by said discriminating means;

further comprising commanding means for commanding start of image formation and control means for starting the operation of image formation with the image forming means set by said first image forming mode setting means in response to the command from said commanding means and, at the same time, allowing subsequent setting of said second image forming mode setting means after completion of said operation of image formation.

2. An image forming apparatus according to claim 1, which further comprises display means for indicating either of said first and second image forming means set by said first image forming mode setting means.

3. An image forming apparatus according to claim 1, wherein said discriminating means discriminates whether said original image is a negative image or a positive image by the detection of luminous energy of the light traveling through the original image.

4. An image forming apparatus comprising:

first image forming means for forming a positive image from a positive original image;

second image forming means for forming a positive image from a negative original image;

discriminating means for discriminating whether an original image is a negative image or a positive image;

automatic image forming mode setting means for selectively setting either of said first and second image forming means in response to the outcome of the discrimination by said discriminating means;

selecting means for selecting either of said first and second image forming means;

manual image forming mode setting means for setting either said first image forming means or said second image forming means in response to the selection effected by said selecting means; and control means for setting the image forming means which is not set by said automatic image forming mode setting means of the first and second image forming means when first the manual image forming mode setting means is selected after the operation of image formation with the automatic image forming mode setting means, said control means thereby enabling a user to avoid manually discriminating whether said original image is positive or negative in the event of incorrect discrimination by said discriminating means.

5. An image forming apparatus according to claim 4, wherein said selecting means include a first selecting portion for selecting the first image forming means and a second selecting portion for selecting the second image forming means, and said control means, when the image forming means set by said automatic image forming mode setting means is selected by the selecting means, nullifies the selection and, when the other image forming means is selected, allows the selection.

6. An image forming apparatus according to claim 4, wherein said first image forming means incorporates a developing unit for normal development and said second image forming means incorporates a developing unit for reversal development.

7. An image forming apparatus according to claim 4, wherein said first and second image forming means incorporate at the opposite terminals thereof with a chargeable photosensitive material and one developing unit.

8. An image forming apparatus according to claim 4, wherein said discriminating means discriminates whether said original image is a negative image or a positive image by the detection of luminous energy of the light traveling through the original image.

* * * * *